United States Patent Office 3,010,154
Patented Nov. 28, 1961

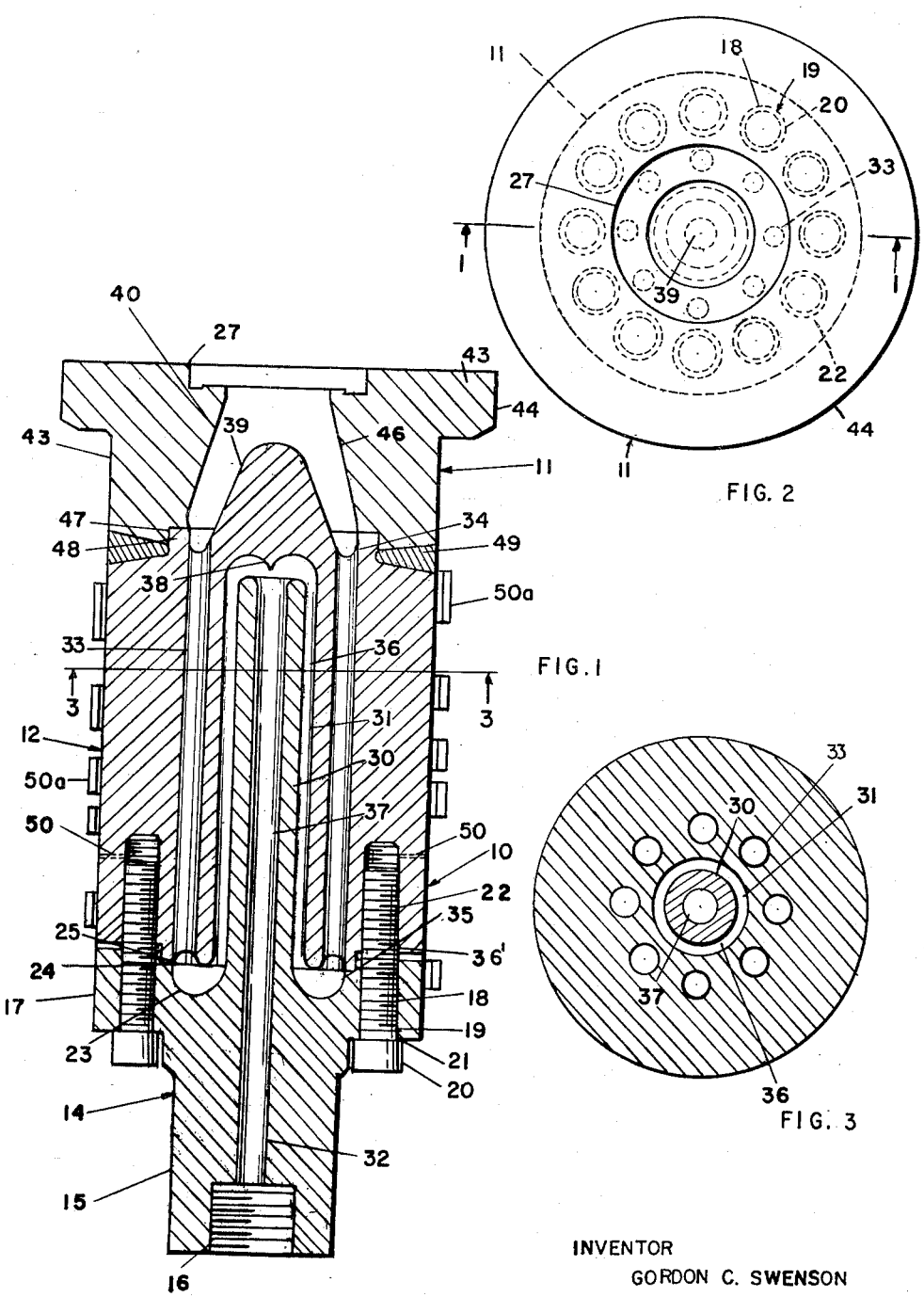

3,010,154
HEATING CYLINDER FOR INJECTION MOLDING MACHINES
Gordon C. Swenson, 310 Arbuckle Road, Erie, Pa.
Filed May 7, 1958, Ser. No. 733,526
6 Claims. (Cl. 18—30)

This invention relates to heating cylinders and, more particularly, to heating cylinders for use in machines for the injection molding of plastic.

Many previous heaters for injection molding were provided with spreaders having flutes or legs which usually extended radially from the spreader. The plastic material sliding through the cylinder engaged these legs and marks were made on the plastic material and strain areas introduced thereinto. The marks and strain areas were often not subsequently mixed out as the material was melted in these prior cylinders since the flow path through the cylinder introduced no turbulence into the plastic material other than the turbulence introduced by the drag of the plastic material on the cylinder walls. This drag did not introduce sufficient turbulence to mix out the strain patterns aforesaid produced in the plastic. In addition, flow rates through these prior heaters varied at different points throughout the cylinder, depending upon the wall section of plastic, number of legs on the spreader, and wall temperatures of the cylinder.

The cylinder disclosed herein provides sharp physical turbulence caused by drag on cylinder walls and planned flow rate through the heater so that as the material gets hotter, its physical volume is decreased while its forward speed is increased in definite steps.

When material leaves the spreader, it receives a violent mechanical mixing action. The stream of plastic flowing through the cylinder is immediately reduced in cross sectional area because the area of the first annular zone is smaller than the area of the spreader holes. The flow is also increased as the plastic enters the reverse area and is forced into the first tubular passage. When material strikes the second reverse area, violent mechanical mixing is again provided with a further reduction in cross sectional area of flow path because the annular passage offered for its exit is smaller than the surrounding hollow cylinder or tube of plastic.

The size of all passages provided for above, both in diameter and in length, depends upon the size and capacity of the press on which the heater is designed to be used. The size of the machine will determine the diameter and length of the cylinder to be used. Thus, when supplied as a replacement heater on existing machines, physical dimensions of the molding machine automatically set the limit on the size and length of the passages.

Other advantages of this design over all other heaters are that the coldest material into which heat is to be introduced for molding is stored between strokes in the outer passages nearest the external heat source while softened or heated plastic material is stored inside the cylinder furtherest from the heat source. It is insulated there from overheating by the partial layer of unheated plastic in the spreader holes and by the cold solid layer of plastic in the first annular ring or tube of plastic which surrounds the central tube.

Another major advantage is that the cylinder provides for more efficient mixing and more efficient melting of each of the two basic types of plastic used today (polyethylene and polystyrene) which differ radically in their behavior inside the heating cylinder. Previous to this invention, changes in material wall section inside the heater and use of various mixing nozzle designs have been used with partial success to overcome the molded in strain patterns and laminations caused by previous cylinder designs. These patterns of strain seen in polaroid examination of molded articles are caused by two things:

(1) Differential flow of plastic through the heating cylinder; and (2 Action of present spreaders on plastic material whose flutes or legs "mark" the plastic passing around or through them with "weld" marks which can be seen in the molded articles. This has been verified by numerous researches evaluating present chambers.

Lamination or layering inside the heating cylinder arises from two different causes. In the case of polystyrene, the material adjacent to the cylinder wall and spreader tends to move faster than the unmelted granules in the center. This pattern tends to push the unmelted granules toward the front of the cylinder between two layers of molten plastic acting as lubricant and itself moving along the cylinder wall and acting as an insulating layer. Without exception, the external surface of the heater is hotter than the spreader because the heat source is outside the spreader. In some cases, it is much hotter than in others. The differential of heat between the outside and inside has been reduced either by improved design or by using internal heaters. In any case, the material forms layers in the melt which are never completely removed and are carried on into the molded part as strains producing cracks, brittleness, or other part failure as evidenced in commercially produced injection molded articles such as brush handles, pitchers, tumblers, etc.

Conversely, in the case of polyethylene type plastic, the material, especially in the initial stages of melting, behaves unlike polystyrene and tends to stick or adhere to the cylinder walls and spreader. The granules are again pushed forward to the front of the cylinder this time between two layers of material, one adhering at one rate to the hot exterior wall and the other layer adhering to the internal or spreader wall with a different rate of adhesion caused by the normally colder spreader surface. Here again, improved design and internal heaters have tended to even up the temperatures of the two surfaces but the lag of polyethylene is often so serious that individual granules can be pushed clear through the heater and be seen as individual particles still unmelted in the molded part as in the bottoms of molded waste baskets, etc.

Tests using colorants prove this lamination and separation in conventional heaters. When using dry colors, migration of the color can be clearly seen in old style heaters as the lamination described above proceeds, depending upon the type of material and cylinder temperature. In old style cylinders, at one stage of the melt, a layer of clear plastic can be found without any colorant present at all, the colorant having migrated and concentrated itself in two definite strata or bands related to the temperature of the outside wall and the spreader. By eliminating this layering effect, from a color mixing as well as a strain reducing point of view, the reverse flow heater disclosed herein represents a great advance over conventional heaters.

Because the material is molten at the point of the first reverse and subsequently, pressure requirements are not more than those of conventional heating cylinders. Also, because the forward portion of the inner annular tube which carries the plastic to the mold projects from the heater body in a separate diameter under control of its own individual heater bands and controllers, it is possible to begin to reduce the temperature of the plastic prior to its introduction in the mold, giving faster cycles, fewer strings, and better cut-off and quicker freezing of the sprue on fast molding, thin section work.

The advantages resulting from the reverse flow heating cylinder as seen in the molded article so produced are freedom from strain which causes stress cracking, dimensional changes, marking, brittleness, crazing, or other failure of the plastic to exhibit its maximum properties. Previous cylinder designs, without exception, passed laminated material into the mold with the result that the plastic became oriented in a single direction basically related to the flow of the plastic through the cylinder and past its obstructions. With the advent of the reverse flow concept, for the first time, it became possible within the standard cylinder to produce sufficient agitation in the plastic material to intermix the various layers of melting plastic so thoroughly as to produce molded parts where the plastic was fully homogeneous or mixed. This could be accomplished without any of the directional orientation resulting from standard heaters which led to part failure as exemplified by loss of toughness in a part in the form of a molded box when flexed from two points at right angles to the orientation. When flexed from two points parallel to the orientation, failure did not occur because the molecular structure was such that normal toughness of the material was retrained in one direction on standard cylinders but lost in the other one parallel to the laminations previously mentioned.

It has only been possible to duplicate results of the reverse flow heater by use of so-called preplasticizing machines. These costly units melt the plastic in a conventional cylinder and squirt it into a second or shooting cylinder for final injection into the mold. Purging as well as first cost and operating costs of these units are so high that they have had small acceptance in the molding industry. The reverse flow cylinder disclosed herein puts these advantages well within the range of any standard molding machine equipped with a cylinder of this unique design.

Another beneficial result of the reverse flow cylinder disclosed herein is in the new concept of front end design permitted by the inner drain tube. A series of external front steps of varying diameter are immediately eliminated and material in the tube can be cooled under its own set of bands and controllers or under an actual water cooled jacketed area. Previously, the material had to converge toward the nozzle and cooling was impossible because of the spreader designs used on all heaters which concentrated the heat in the forward end of the chamber. Also, the high body heat invaded the front steps, often getting entirely out of control as evidenced by the difficulty encountered with nylon on some cylinder designs. The forward or storage end of the chamber can be reduced to a constant I.D. and O.D. and the temperature of the stored material held under highly uniform condition immediately prior to injection. The benefits of this design are faster cooling of the sprue, lower temperature of injected stock, permitting faster cooling of the molded article, and uniform storage conditions of the plasticized material in the coolest (internal) portion of the cylinder.

It is, accordingly, an object of this invention to provide a simple, easily cleaned heating cylinder which provides a plurality of sharp turns in the flow path of plastic material as it passes through the heating cylinder to introduce turbulence and to intermix the melted plastic in addition to the normal turbulence caused by the drag of the plastic material on the cylinder wall.

Another object of this invention is to provide a heating cylinder which will cause a predetermined flow rate of the plastic through the cylinder so that as the material flowing therethrough becomes hotter, its physical volume is decreased while its forward speed is increased in definite stages.

Still another object of the invention is to provide a heating cylinder wherein the material, after leaving the spreader in the heating cylinder, receives a violent mechanical mixing action due to the impingement in the boundaries of the reverse areas. It also immediately reduces in cross sectional area of plastic stream because the area of the first annular zone is smaller than the area of the spreader holes. The velocity of the plastic flowing through the cylinder is also increased as the plastic enters the first reverse area and is forced into the first tubular passage.

A further object of the invention is to provide a heating cylinder wherein the material strikes the second reverse area and violent mechanical mixing is again provided at the second reverse area with a further reduction in cross section of plastic stream and increase in speed due to the annular passage being reduced in area.

Still a further object of the invention is to provide a heating cylinder and to lead the hot melt from the cylinder through a hollow tube which does not mark, deform, or disturb the flow in any way.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view taken on line 1—1 of FIG. 2;

FIG. 2 is a top view of a cylinder according to the invention shown in FIG. 1; and FIG. 3 is a cross sectional view taken on line 3—3 of FIG. 1.

Now with more specific reference to the drawing, a heating cylinder 10 for use in an injection molding machine for plastic is shown. The cylinder 10 has a clamping or conventional flange section 11, a spreader section 12, and a nozzle section 14.

The nozzle section 14 has a reduced size end 15 terminating in a threaded bore 16 for attaching to a suitable connecting nozzle to feed a plastic molding die. The reduced size end 15 is integrally connected to an enlarged end 17 which is, in effect, a flange extending outwardly from the reduced size end 15. Spaced bores 18 receive studs 19 having heads 20. The enlarged end 17 has a flat shoulder surface 21 which is engaged by the stud heads 20. The studs 19 threadably engage threaded holes 22 threaded at 36' in the spreader section 12. An alternate method of fastening the nozzle section 14 to the spreader section 12 may be by means of welding as taught in Patent No. 2,766,483.

An annular groove 23 is formed in the end of the nozzle section 14 adjacent the spreader section 12 and outwardly of the annular groove 23 is formed an annular bore 24. The bore 24 receives an annular end portion 25 of the spreader section 12 and overlies the end portion 25 and, acting as a register, it holds it against outward movement.

The nozzle section 14 has a tubular inner member 30 integrally attached thereto and forming the inner wall of the annular groove 23. The tubular member 30 extends into a bore 31 in the spreader section 12 and the bore through the tubular member 30 forms a continuation of a bore 32 in the outer end of the nozzle section 14 and the bore in the tubular member 30 and the bore 32 form a storage tube 37.

The spreader section 12 is a cylindrical section having spaced bores 33 extending therethrough and terminating in the upper end at 34 and at the lower end at 35. The spaced bores 33 form a first passage through the cylinder 10. A central bore 36 receives the tubular inner member 30 as aforesaid. The blind end of the bore 31 may be formed as shown with a central conical raised portion 38 which forms a directing baffle for directing the plastic material into the storage tube 37. The central upper end of the spreader section 12 terminates in a spreader tip 39 which has a hemispherical shape and extends into an inlet 40 of the flange section 11. The spreader tip 39 and the part of the spreader section inward of the spaced bores 33 may be considered to be the spreader itself disposed inside the hollow body made up of the nozzle section and clamping section and concentrically inside the outer part of the spreader section. The spreader itself is connected to the outer part of the spreader section by means of the material between the bores 33.

The flange section 11 may be so designed that the spreader tip 39 is a sufficient distance from an edge 27 that a volume of plastic may be stored therein sufficient to complete one shot or cycle.

The flange section 11 has a body portion 43 with a flange 44 outwardly extending therefrom and integrally attached thereto. The flange 44 provides a means for attaching the cylinder 10 to an injection molding machine. The flange section 11 has a tapered bore 46 which forms an inlet to the bores 33 which forms a first passage. The bore 36 forms a second flow passage between its walls and the tubular member 30 extending from the portion 38 to the groove 23. The storage tube 37 forms a third passage. The lower end of the flange section 11 is counterbored at 47 to receive an upwardly extending rim 48 of the spreader section 12 and a groove is machined between the flange section 11 and the nozzle section 14 to receive welding material 49 to hold the cylinder 10 in rigid assembled relation. The overlying shoulders formed by the edges of the counterbore 47 hold the flange section 11 and the spreader section 12 together so that there is no relative movement during thermal expansion. Heat may be provided for the cylinder by means of electrical heating elements 50a.

Holes 50 are formed in the side walls of the spreader section 12. The holes 50 connect the threaded holes 22 with the outside of the cylinder 10 to allow gases which enter the threaded holes 22 from the inside of the cylinder 10 to escape.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A heating cylinder for plastic injection molding machines comprising a hollow body having an inlet adapted to be connected to an injection molding machine and an outlet for connecting to a mold, a spreader in said body, said spreader being disposed generally concentric to said hollow in said body and spaced therefrom defining a first flow passage therebetween communicating with said inlet, a bore in said spreader concentric with said first flow passage and communicating therewith and defining a second flow passage connected to said first flow passage, and a storage tube in said spreader generally concentric with said second flow passage and communicating with said outlet to said cylinder, and heating means on the outside of said body.

2. A heating cylinder for injection molding comprising a hollow body having an inlet adapted to be connected to an injection molding machine and an outlet adapted to be connected to a mold, a first, a second, and a third flow passage through said body, said first flow passage communicating with said inlet at one end and communicating with said second flow passage at the other end, said second flow passage being connected with said third flow passage at the end thereof opposite to said end connected to said first flow passage, said third flow passage being connected to said outlet, said flow passages being arranged so that the flow therethrough in said second flow passage is in a direction one hundred eighty degrees to the flow through said first flow passage and the flow in said third flow passage is in the same direction as in said first flow passage, said flow passages being disposed concentric to each other with said first flow passage outward of said second and third flow passages, and heating means disposed around said hollow body.

3. A heating cylinder for use in the injection molding of plastic material comprising a hollow body having an inlet adapted to be connected to a source of relatively cold plastic material, an outlet adapted to be connected to a die means, a spreader disposed in said hollow body and defining the inside surface of a first annular passage, said spreader having an end projecting toward said inlet, a second passage disposed inside said spreader and generally concentric to said first passage and connected thereto so that plastic material flows therein in a direction one hundred eighty degrees to the flow through said first passage, and a third passage connected to said second passage and concentric thereto and connecting said second passage to said outlet.

4. The cylinder recited in claim 3 wherein the cross sectional area of said third passage is less than the cross sectional area of said first and second passages whereby the velocity of flow of plastic material through said third passage increases over the velocity of flow through said second passage.

5. A heating cylinder for an injection molding machine comprising a flange section, a spreader section, a nozzle section, said sections being connected together with said spreader section between said other sections, an opening through said flange section comprising an inlet, said spreader section having a central bore open toward said nozzle section, said nozzle section having a tube thereon extending toward said spreader section and into said bore, the opening through said tube terminating at one end in an outlet, spaced holes in said spreader section disposed around and outwardly of said central bore and communicating with the opening through said inlet and with said central bore, and a member on said spreader section extending into said opening through said flange section, the end of said central bore through said spreader section adjacent said flange section being closed, said flange section opening, said spaced holes, and said tube comprising a first, a second, and a third flow passage, respectively.

6. A heating cylinder comprising a body having all parts fixed rigidly together, an axially disposed flow passage therein with an inlet for cold plastic and an outlet for molten plastic, said flow passage having a plurality of concentrically disposed paths connected in series whereby the direction of flow of plastic is changed one hundred eighty degrees from said outlet toward said inlet and then flows back to a position adjacent said inlet and its direction is again changed toward said outlet, and heating means for said cylinder, the cross sectional area of said passage decreasing toward said outlet.

References Cited in the file of this patent
UNITED STATES PATENTS

| | | |
|---|---|---|
| 2,122,228 | Goehler | June 28, 1938 |
| 2,405,039 | Jesionowski | July 30, 1946 |
| 2,653,351 | Henning | Sept. 29, 1953 |
| 2,766,483 | Stokes | Oct. 16, 1956 |
| 2,848,739 | Henning | Aug. 26, 1958 |

FOREIGN PATENTS

| | | |
|---|---|---|
| 1,013,875 | Germany | Aug. 14, 1957 |